United States Patent [19]

Bartlett

[11] Patent Number: 4,907,151
[45] Date of Patent: Mar. 6, 1990

[54] SYSTEM AND METHOD FOR GARBAGE COLLECTION WITH AMBIGUOUS ROOTS

[75] Inventor: Joel F. Bartlett, Los Altos, Calif.

[73] Assignee: Digital Equipment Corporation, Maynard, Mass.

[21] Appl. No.: 251,554

[22] Filed: Sep. 30, 1988

[51] Int. Cl.[4] ............................................. G06F 12/00
[52] U.S. Cl. ............................... 364/200; 364/230.0; 364/246.0; 364/281.1
[58] Field of Search ... 364/200 MS File, 900 MS File, 364/300 MS File

[56] References Cited

U.S. PATENT DOCUMENTS

| | | | |
|---|---|---|---|
| 4,121,286 | 10/1978 | Venton et al. | 364/200 |
| 4,642,790 | 2/1987 | Minshull et al. | 364/900 |
| 4,660,130 | 4/1987 | Bartley et al. | 364/200 |
| 4,716,524 | 12/1987 | Oxley et al. | 364/200 |
| 4,755,939 | 7/1988 | Watson | 364/300 |
| 4,775,932 | 10/1988 | Oxley et al. | 364/200 |
| 4,797,810 | 1/1989 | McEntee et al. | 364/200 |
| 4,807,120 | 2/1989 | Courts | 364/200 |

OTHER PUBLICATIONS

Jacques Cohen, "Garbage Collection of Linked Data Structures", ACM Computing Surveys, vol. 13(3):341–367, 9/1981.

T. McEntee, "Overview of Garbage Collection in Symbolic Computing", LISP Pointers, vol. 1(3):8–16, Aug. 1987.

P. Rovner, "On Adding Garbage Collection and Runtime Types to a Strongly-Typed, Statically-Checked, Concurrent Language", Xerox Palo Alto Research Center Publication number CSL-84-7, Jul, 1985.

Primary Examiner—David Y. Eng
Attorney, Agent, or Firm—Flehr, Hohbach, Test, Albritton & Herbert

[57] ABSTRACT

In a computer system, a dynamic memory allocation and recovery system and method, sometimes referred to as a garbage collection system and method, provides a heap of storage space for storing program objects generated by a task. The heap is divided into pages whose size is independent of physical page sizes used by the computer system. Pages are denoted an unallocated or allocated for storing program objects. A root stroage area stores information called hints regarding program objects stored in the heap. The hints can include ambiguous pointers which may or may not point to program objects stored in the heap. Garbage collection is performed by promoting and retaining all pages in the heap which are referenced by hints, and by copying into previously unallocated pages all other accessible program objects in the heap. All pointers to the copied program objects are replaced with pointers to the new copies of those program objects. As a result, all program objects located in pages pointed to by ambiguous pointers are left in their original position, and only the pointers to the copied program objects are replaced with pointers to the new copies of the program objects. After garbage collection, the set of allocated pages for the task includes all promoted and retained pages pointed to by ambiguous pointers as well as all pages containing the new copies of the copied program objects. All other pages in the heap become the unallocated pages available for storing new program objects generated by the task.

10 Claims, 6 Drawing Sheets

SYSTEM AND METHOD FOR GARBAGE COLLECTION WITH AMBIGUOUS ROOTS

The present invention relates to computer systems, and particularly to garbage collection in dynamic memory allocation systems.

A portion of the disclosure of this patent document contains materials to which a claim of copyright protection is made. The copyright owner has no objection to the facsimile reproduction by anyone of the patent document or the patent disclosure, but reserves all other rights whatsoever.

BACKGROUND OF THE INVENTION

Many computer systems dynamically allocate memory to a task. The following is a somewhat simplified explanation of a method for dynamic memory allocation and garbage collection.

Referring to FIG. 1, in a typical multitasking computer system 20 each active task is assigned a portion 24 of the computer's memory space 22. The memory space 24 assigned to a task can be divided into three regions: one region 26 for holding the code which represents and controls the task, another region 28 that contains a set of "root" pointers used by the task, and a third region 30, called the heap, which is used for dynamic memory allocation.

It should be understood that FIG. 1 represents only one of many ways in which memory may be allocated for storing the roots, code and heap associated with a task or a set of tasks.

When the task associated with the heap 30 needs space for storing an array or other program "object", it requests and is allocated a block of memory 32 in the heap 30. Additional requests for memory will result in the allocation of memory blocks 34, 36, 38, 40 and so on. Clearly, if the task continues to ask for more memory, all the space in the heap 30 will eventually be used and the task will fail for lack of memory. Therefore space must be restored by either explicit actions of the program, or some other mechanism.

It is well known that most tasks "abandon" much of the memory space that is allocated to them. Typically, the task stores many program objects in allocated memory blocks, and discards all pointers to many of those objects after it has finished processing them because it will never need to access those objects again. An object for which there are no pointers is often termed an "inaccessible object", and the memory space it occupies is "inaccessible" to the task which once used it. For instance, in FIG. 1 the accessible objects on the left half of heap 30 are shaded, and the inaccessible objects are not shaded.

The solution to this problem is to recover blocks of memory space in the heap 30 which are no longer being used by the task. Garbage collection is the term used to refer to automatic methods of recovering unused memory in the heap 30. Garbage collectors generally gather and recover unused memory upon the occurrence of a certain amount of memory usage, most typically when half of the storage space in the heap 30 has been allocated.

Thus, the purpose of garbage collection is to recover unused or abandoned portions of memory in a heap 30 so that the task using the heap 30 will not run out of memory.

For the most part, there are two primary prior art garbage collection techniques. One is called Stop and Copy, and the other is herein called Mark and Sweep.

Stop and Copy Garbage Collectors.

Stop and Copy garbage collectors compact the memory used by a task by copying all "accessible objects" in the heap to a contiguous block of memory in the heap, and changing all pointers to the accessible objects so as to point to the new copy of these objects. An accessible object is any object (i.e., block of memory) which is referenced, directly or indirectly, by the "roots" or "root set" of the task. Typically, the "roots" of a task are a set of pointers stored in known locations (generally in the program stack and registers used by the task), which point to the objects used by a task. Many of those objects, in turn, will contain pointers to other objects in the task. The chain, or tree, of pointers emanating from the root set indirectly points to all of the accessible objects in the heap.

The entire set of objects referenced by these pointers is herein called the set of accessible objects. Inaccessible objects are all objects not referenced by the set of pointers derived from the root.

By copying all accessible objects to a new contiguous block of memory in the heap, and then using the new copy of the objects in place of the old copy, the Stop and Copy garbage collector eliminates all unused memory blocks in the heap. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory.

The right half of the heap 30 in FIG. 1 shows the set of accessible objects 42 after being copied to a contiguous part of the heap. As shown, the new copy takes less space than the old copy, because the old copy included abandoned, inaccessible objects. After copying the accessible objects, the previously used portion of the heap is released and made available for storing new program objects.

Another attractive property of Stop and Copy garbage collectors is that such collectors can have a running time proportional to the amount of accessible storage. The reason for this is that Stop and Copy collectors only process accessible objects, and ignore unaccessible objects. Thus, for example, if only thirty-five percent of the allocated memory space in the heap 30 is retained during garbage collection, the Stop and Copy collector only processes thirty-five percent of the allocated space.

However, a disadvantage of Stop and Copy garbage collectors is that these collectors cannot be used in computer systems which have "ambiguous roots" - i.e., objects in the root which may or may not be pointers. An "ambiguous root" may, in fact, be a piece of data (such as a loop counter). Since all accessible objects are copied and moved to new locations in memory, all pointers to the accessible objects must be found and changed so that these pointers continue to point to the appropriate objects. It clearly would be unacceptable for an object which might be a pointer, but is in fact a data value (such as loop counter), to be changed in value by the garbage collector. Thus, the Stop and Copy collector must be able to unequivocally distinguish between pointers and other data, and must be able to find all pointers to accessible objects. This requirement is sometimes called "root finding" - i.e., the collector must be able to find all the roots of a task.

In most Lisp implementations, root finding is not a problem, and thus a standard Stop and Copy garbage collector can be used. In a specialized Lisp machine such as the MIT CADR and its descendants, everything is tagged and complex instructions perform references directly from tagged objects. In implementations on stock hardware such as VAX LISP, great efforts are made to control instruction sequences, stack layout, and register use so as to enable root finding. There, some registers may contain untagged pointers, or pointers into the middle of objects, so some protocol must be provided to keep them updated.

Other computer environments present more serious problems in finding roots. If a Lisp system uses an intermediate language as its target language, then it may have very little control over the actual code generated. While this approach may simplify the compiler and result in fast code because of the extensive machine dependent optimization provided by the intermediate language processor, it will not assure that Lisp pointers are treated in a uniform manner. Even a Lisp system which normally has complete control over its environment may find that it has problems supporting call-out to, and call-back from, foreign functions.

In summary, the primary problem with classical Stop and Copy garbage collectors and existing collectors derived from them is that they cannot be used in computer systems with ambiguous roots.

Mark and Sweep Garbage Collectors.

One collection method that has been used in the past in environments without reliable roots is Mark and Sweep. Unlike Stop and Copy garbage collectors, Mark and Sweep collectors do not copy objects from an old space into a new space. Instead, the goal is only to identify all of memory which might be an accessible object, with all remaining portions of the heap being denoted as free for future allocation to the task.

In Mark and Sweep collectors, each object which might be a root is treated in a conservative manner. That is, objects that might be valid pointers are treated as pointers for purposes of storage retention. As this type of collector will never relocate any objects, the only cost of guessing wrong is retaining extra data. While such a collector will work, it is not entirely satisfactory because it will not compact the heap (because no data is moved), and its execution time is proportional to the total heap size (because all of the heap must be processed).

Thus, neither Stop and Copy nor Mark and Sweep garbage collectors are entirely satisfactory garbage collectors.

Present Invention.

To solve these problems, the present invention provides a garbage collection method suitable for use in a computer system with ambiguous roots. Instead of requiring that the root set be a known set of pointers which define all accessible storage, the present invention only requires that the root set include pointers which define all accessible storage. That is, the root set need not all be pointers, nor is it required that there not be program objects in it which "look like pointers." The set of pointers and objects which look like pointers in the root are called "hints".

Using this root set, the present invention divides all accessible objects in the heap into two classes: those directly referenced by hints, and those referenced by unambiguous pointers. The former items are left in place, and the latter items are copied into a compact area of memory. In practice, only a very small amount of the heap is left in place, so memory fragmentation is not a problem.

Thus, it is a primary object of the present invention to provide a garbage collection system and method which provides the advantages of both Stop and Copy collectors and Mark and Sweep collectors, without their disadvantages.

More particularly, it is an object of the present invention to provide a garbage collection system and method which marks and retains memory blocks referenced by hints, and which copies and thereby compacts all other accessible objects.

SUMMARY OF THE INVENTION

In summary, the present invention is a system and method for dynamic memory allocation and recovery, sometimes referred to herein as a "mostly copying" garbage collection technique. The invention provides a heap of storage space for storing program objects generated by a task, the heap being divided into pages whose size is independent of the physical page sizes used by the computer system.

For the purposes of dynamic memory allocation, pages in the heap are denoted as unallocated or allocated for storing program objects. A root storage area stores information called hints regarding program objects stored in the heap, including unambiguous pointers to program objects stored in the heap and ambiguous pointers which may or may not point to program objects stored in the heap. Program objects contain additional pointers to other program objects.

Garbage collection is performed by "promoting" and retaining all pages in the heap which are referenced by hints, and by copying into previously unallocated pages all other accessible program in the heap. The copied objects are found by using the unambiguous pointers in the program objects in the promoted and retained pages of the heap. The garbage collection process replaces all pointers to the copied program objects with pointers to the new copies of those program objects. As a result, all program objects located in pages "pointed to" by ambiguous pointers are left in their original position, and only the pointers to the copied program objects are replaced with pointers to the new copies of the program objects. In this way, all ambiguous pointers are left unchanged in value, and the invention avoids having to determine whether to replace the ambiguous pointers with pointers to potentially nonexistent program objects.

In addition, the invention compresses the storage required for program objects outside the pages pointed to by ambiguous pointers, thus achieving most of the benefits of conventional Stop and Copy garbage collectors.

After garbage collection, the set of allocated pages for the task includes all pages pointed to by ambiguous pointers as well as all pages containing the new copies of the copied program objects. All other pages in the heap become the unallocated pages available for storing new program objects generated by the task.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The garbage collector provided by the present invention is best understood by showing how it is an evolution of the classical Stop and Copy collector.

Figure 2:
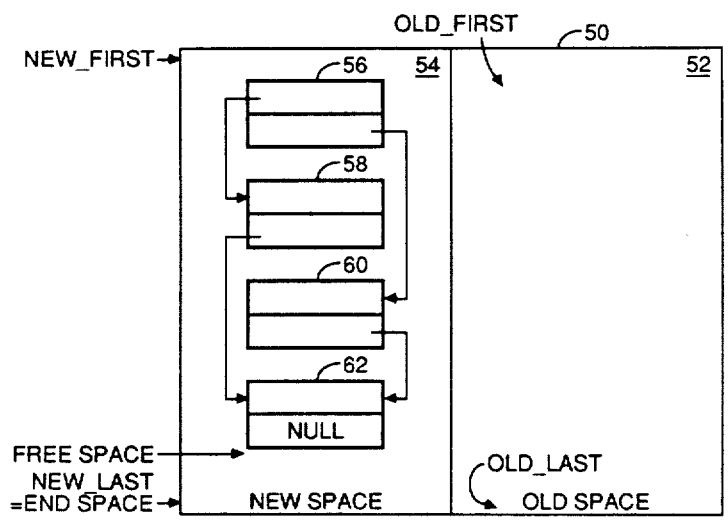
FIG. 2 depicts a list structure within a heap divided into two semispaces.

For those not skilled in the art, it is noted that largely for historical reasons, garbage collection techniques are traditionally demonstrated by showing how they process "cons cells" - fixed-length arrays containing two pointers in each "cell". Cons cells are program objects used by Lisp systems, the context in which the classical garbage collection techniques were developed. A set of four interconnected cons cells 56, 58, 60 and 62 is shown in FIG. 2.

Examples of computer programs, written in the C programming language are included for a number of the procedures discussed below. The procedures in the C programming language show how various garbage collection techniques would be used to process cons cells. In addition, the Appendices at the end of this specification provide exemplary procedures which show how to apply these garbage collection techniques to a more generalized set of program objects.

For the purposes of this description, the term "program object" refers to any block of stored data treated as a unit. Furthermore, the terms "program object", "item", "cons cell" and "cell" are used interchangeably throughout most of this description.

Generally, any garbage collection technique which can be shown to work on a set of cons cells can also be made to work on a more general set of program objects. For the purposes of this specification, it is assumed that there all program objects can be described as either (a) a cons cell, or (b) a block of storage, with well defined rules defining the length of the block, the number of "pointers" and in the block, and the location of those pointers in the block. As will be explained in much more detail below, the present invention, unlike prior art garbage collection techniques, can perform a compacting garbage collection even in systems in which the "pointers" in some program objects are actually data values which just look like pointers.

An Overview of Stop-and-Copy Garbage Collection

Referring to FIG. 2, the classical Stop and Copy method manages a heap 50 which is implemented using a contiguous block of storage. The storage heap 50 is divided into two equal semispaces: "old space" 52 and "new space" 54.

Also shown in FIG. 2 is a sample list structure 56-62. This list structure represents a set of interconnected "cons cells". Each cons cell is a fixed-length array of just two pointers: one called "car" and the other is called "cdr". Each of the "car" and "cdr" pointers in any cons cell either points to another cons cell or is NULL.

```
        typedef struct cons_cell
    {       struct cons_cell *car;
            struct cons_cell *cdr;
    } *CP, CONS_CELL;
```

Generally, during all times except garbage collection, all cells allocated to the task are in New Space. A free space pointer FreeSpace points to the next block of available storage. When storage in the heap 50 is allocated to the task, the FreeSpace pointer is advanced to the next available block of storage in New Space. Thus, storage can be and is allocated to the task until all of the storage in New Space has been allocated.

The following function, named cons, allocates space for the storage of a new cons cell:

```
    CP cons( car, cdr )
        CP car, cdr;
    {
        CP p;
        if (freespace > endspace) collect();
        p = freespace;
        freespace = freespace + 1;
        p->car = car;
        p->cdr = cdr;
        return( p );
    }
``` where "endspace" is the last usable space in New Space, and "collect( )" is the instruction for calling a garbage collection routine when there is no space left in New Space.

When all space in a semispace has been allocated, leaving no room for the storage of new cells or other program objects, the garbage collector is invoked. The first thing that it does is "flip" the semispaces, i.e., exchange the designations for Old Space and New Space, so that all of the objects allocated to the task are in Old Space and so that New Space is a totally unallocated, contiguous block of memory.

```
    freespace = old_first;
    endspace = old_last;
    old_first = new_first;
    old_last = new_last;
    new_first = freespace;
```

-continued
```
        new_last = endspace;
        sweep = freespace;
```

Here, old_first and new_first point to the first available storage location in each of the semispaces, and old_last and new_last point to the last available storage location in each semispace.

Following this, the collector copes all accessible objects into the new space. This is done in two steps. The first step is to move all items pointed to by a root set of known cons cells (i.e., a predefined set of pointers called the root set) to the New Space. The items pointed to by the root set are sometimes called the immediately accessible items. Once the immediately accessible items have been moved, the second step of the of the collection process is to move all items pointed by the previously moved items.

The C language program for Stop and Copy collection on a set of cons cells, using the above defined cons function, is as follows:

```
/* First Step: Move immediately accessible items */
for (i = 0; i < root_count; i = i+1) {
  root[ i ] = move( root[ i ] );
}
/* Second Step: Move items pointed to by
previously moved items*/
  while (sweep != freespace) {
    sweep->car = move( sweep->car );
    sweep->cdr = move( sweep->cdr );
    sweep = sweep+1;
  }
/* Move Function: */
  CP move( cp )
    CP cp;   /* Pointer to a cons cell */
  {
    /* If cp is NULL or points to an object already
    in the new space, no copying is needed */
    if (cp = NULL || (new_first <= cp && cp<= new_last))
    return( cp );
    /* Return forwarding ptr for copied objects */
    if (new_first <= cp->car && cp->car <= new_last)
    return( cp->car );
    /* Copy object to new space, place forwarding ptr in old */
    cp->car = cons( cp->car, cp->cdr );
    return( cp->car );
  }
```

Objects are moved into the new space by the move function shown above, which works as follows. The object to be moved is specified by a pointer to the object. Generally, this pointer will be located in either the root set, or in an object which has already been moved. The move function returns a pointer which points to the position of the copied object in New Space. In addition, when an object is moved, the first pointer in the object is replaced with a forwarding pointer to the copy of the object in New Space. This enables the garbage collector to identify objects already copied into New Space, and also to replace pointers to old copies of objects with pointers to the new copy.

If the pointer passed to the move function is NULL or if it points to an object already in the new space, then no conversion is necessary and the move function returns the same pointer value as was passed to it. Otherwise, the object is examined to see if it contains a forwarding pointer to the copy of the object in new space. If so, then the pointer to the new space copy is returned by the move function so that the pointer to the old copy of the object will be replaced with a pointer to the new copy of the object. Failing these tests, the object must be copied to New Space. The contents of the object are copied into the space allocated for the new copy of the object, and a forwarding pointer is left in the old copy of the object. Note that when a specified object is copied into the new space, the objects pointed to by the pointers in the specified object are not copied at the same time.

Figure 3:
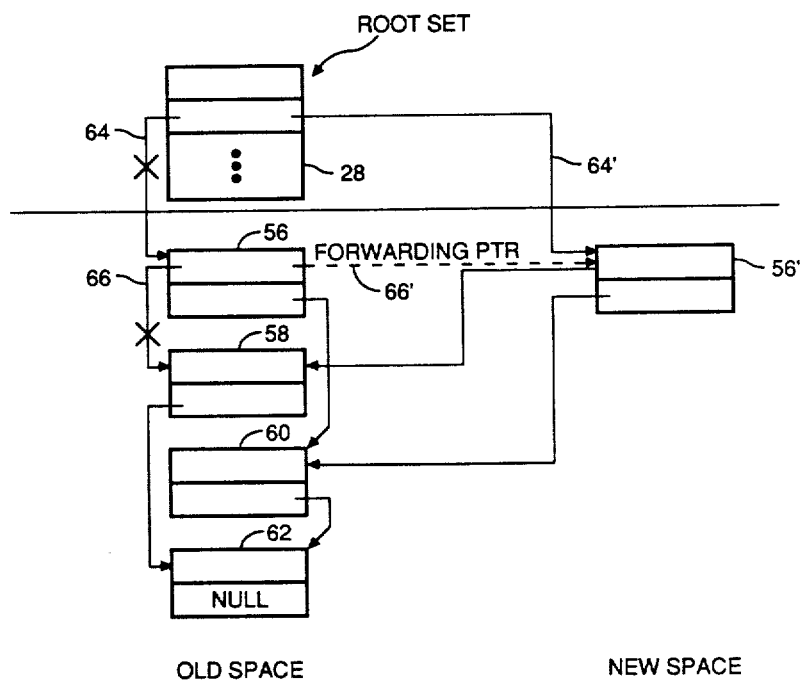
FIG. 3 depicts the first step of the Stop and Copy garbage collection process.

FIG. 3 shows a simple example of a collection using the Stop and Copy collection method just described. Somewhere in the root set 28 for the task using the heap 30, there exists a pointer to the head of the sample data structure 56-62 shown in FIG. 2. The first step of the Stop and Copy collection process is to move all immediately accessible items pointed to by the root set to New Space. Thus, item 56 is copied into New Space, the first pointer 66 in item 56 is replaced with a forwarding pointer 66' to the new copy of the item 56', and the pointer 64 in the root is replaced with a new pointer 64' to the new copy of the item 56'. As shown, the result of the first step is copying the head of the list 56-62 into New Space.

Figure 4:
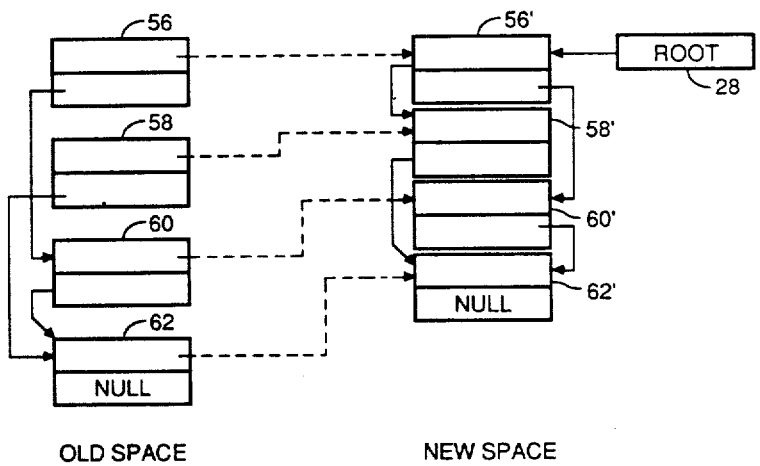
FIG. 4 depicts the data structures at the conclusion of the Stop and Copy garbage collection process.

FIG. 4 shows the result of applying step two of the collection process to the list 56-62 shown in FIG. 3. As shown, New Space contains a compressed copy of the list 56-62, and all of the objects in Old Space contain forwarding pointers to their counterparts in New Space.

Once all pointers in the new space have been updated, the garbage collection is complete. Storage is then allocated out of New Space until it is exhausted, at which point the garbage collector is again invoked. It is also noted that at the completion of garbage collection, all of the objects and pointers in Old Space are no longer needed, and Old Space is effectively empty because there are no longer any pointers in the root set 28 which point even indirectly to Old Space.

Present Invention: Mostly Copying Collector Version I

The classical Stop and Copy collector requires that the system provide it with a root set of cells which contains valid pointers to find all accessible storage. This is typically done by extracting the root set from the current program state which is contained in the processor's registers and stack. In order to do this, the collector must know how the registers and stack are used. At any given time, it must be able to correctly identify those registers which contain pointers or derived pointers. Similarly, the stack format must be known, as all items which are pointers or derived pointers must be found amongst the stack frames, local variables, and procedure arguments.

In summary, the garbage collector must find all heap pointers in the root set and change them to point to new copies of the accessible objects in the heap. At the same time, it is imperative that no other objects, including those which "look like" pointers, be changed by the garbage collector.

Two versions of the present invention are presented. The first version differs from the Stop and Copy collector by allowing for the presence of "ambiguous pointers" in the root set, but not in any other program objects. The second version differs by allowing "ambiguous pointers" in other program objects as well as in the root set. Both versions are called "mostly copying" collectors because most, but not all, of the accessible objects in the heap are collected by copying them.

An "ambiguous pointer" is herein defined to be an object which may or may not be a pointer to an object in the heap. That is, an ambiguous pointer is a value which the garbage collector cannot categorically determine to be either a valid pointer or not. Ambiguous pointers are generally stored in locations that can be used to store pointers as well as data values that are not pointers.

An "unambiguous pointer" is an object which a garbage collection routine can determine is a pointer.

The primary problem with handling an ambiguous pointer during garbage collection is that it would be disastrous to change the value of such a "pointer" if it turns out to be a data value rather than a pointer. Thus ambiguous pointers cannot be changed in value during the collection process, and "objects" pointed to by ambiguous pointers cannot be moved. As a result, the prior art has resorted to the use of Mark and Sweep collectors for systems with ambiguous pointers, as described above.

The present invention makes few restrictions on the root set. It simply requires that somewhere in the root set, there be sufficient "hints" (i.e., pointers and ambiguous pointers) to find all accessible objects stored in the heap. A typical root set is the current program state, i.e., the entire contents of the processor's stack and registers. In other words, the present invention allows the root set to contain both pointers and nonpointer data as long as the root set contains a sufficient set of ambiguous and unambiguous pointers to find all accessible objects.

The set of pointers and objects which look like pointers in the root are herein called "hints". Thus, the term "hints" is herein defined to mean both pointers and ambiguous pointers which may or may not be a pointer to objects in a heap. Furthermore, other program objects outside the root set which look like pointers (but which may not be pointers) are also herein called hints.

The terms "referenced by X" and "pointed at by X" are herein defined to mean referenced or pointed at when using X as a pointer, even if X is in fact a program object that just looks like a pointer. In other words, objects and pages in the heap are said to be referenced or pointed at by "hints" even if the hints turn out not to be pointers.

Figure 5:
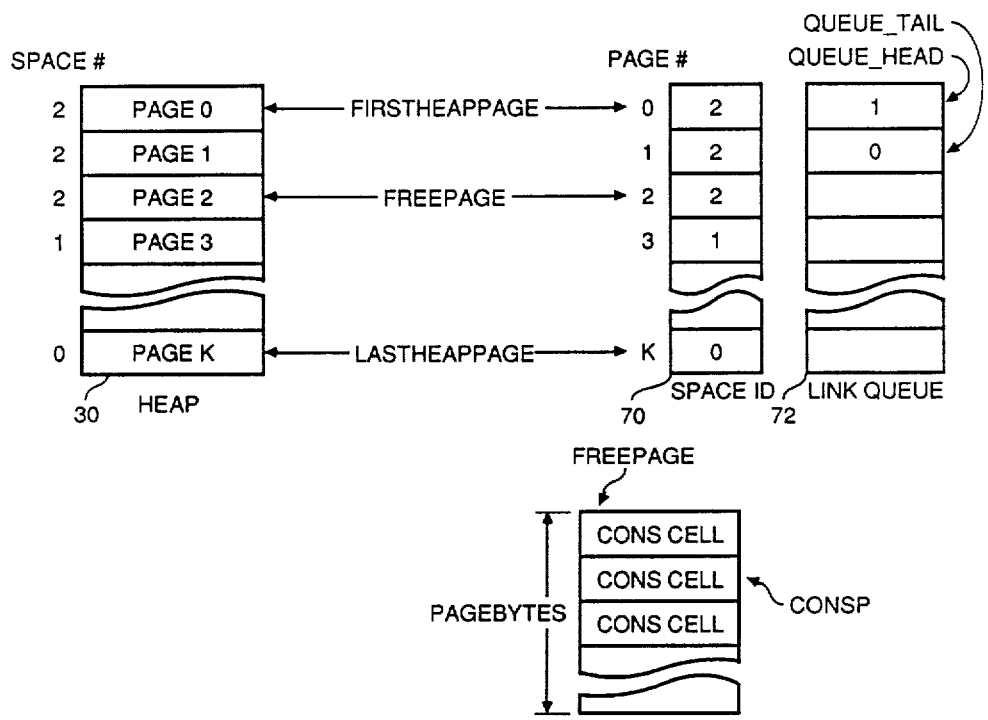
FIG. 5 depicts the data structures used by a first embodiment of the present invention.

Referring to FIG. 5, the heap 30 used by the present invention is a contiguous region of storage, divided into a number of equal-size pages Page 0 to Page K, where the page size is independent of the underlying hardware's page size. Associated with each page is a space identifier, Space, which identifies the "space" that objects on the page belong to. An array 70 called SpaceId stores the space identifiers for all of the pages in the heap.

Figure 6:
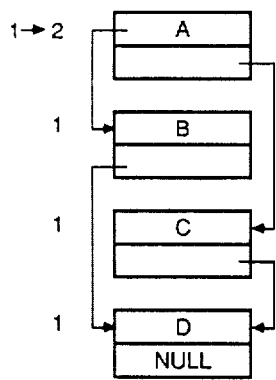
FIG. 6 depicts a list structure with associated space identifiers.
Figure 7:
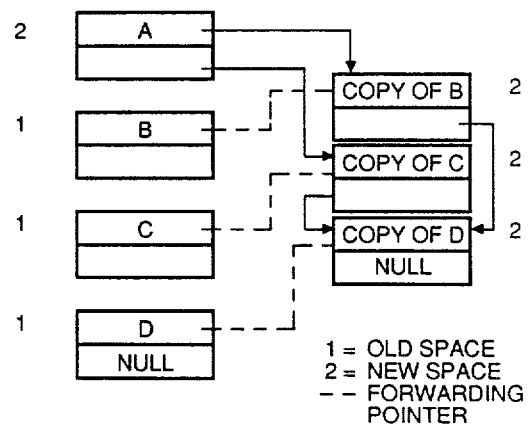
FIG. 7 depicts the list structure of FIG. 6 after processing by the present invention.

In the figures illustrating this collection method, the Space identifier associated with the page containing each cell shown is the number to the left of the cell (e.g., see FIGS. 6 and 7).

Two space identifiers: current space and next space, identify the sets of pages used during the garbage collection process. During normal dynamic space allocation, current space and next space are equal, but during garbage collection, next space is set to the "next" space identifier - e.g., a value one greater than the value of current space, modulo a large integer. In FIG. 5, current space equals 1, next space equals 2, and unallocated pages have a SpaceId equal to 0. Note that when the value of next space is set at the beginning of each garbage collection, none of the pages in the heap have a space identifier equal to next space.

When comparing this collection method with the classical one, it is reasonable to think of pages with their space identifier equal to next space as the analogue of "new space", and those with their Space identifier equal to current space as the analogue of "old space". Like the classical Stop and Copy collector, this collector works by moving objects from "old space" to "new space". While this can be done by copying objects to newly allocated pages in next space, it can also be done by changing the Space identifier associated with the page holding the object to next space. As will be explained in more detail below, this later method is the key to mostly copying collection technique of the present invention, as it leaves the object's address unchanged.

When using a heap divided into equal sized pages, memory allocation is a two part process: first, a page of memory is allocated, and then space is allocated from it. In FIG. 5, the page from which space is being allocated is pointed to by "freepage". A page is free, or available for allocation, when its Space filed is not equal to current space or next space. When it is allocated, its Space identifier is set to next space.

The C language allocation junction for a system using only cons cells is as follows:

```
CP cons( car, cdr )
    CP car, cdr;
{
    CP p;
    /* If freepage is full, allocate new page */
    while (conscnt = 0) allocatepage( );
    p = consp;
    consp = consp+1;
    conscnt = conscnt-1;
    p->car = car;
    p->cdr = cdr;
    return( p );
}
/* Returns page number of next page in the heap */
int next_page( page )
    int page;
{
    if (page = lastheappage) return( firstheappage );
    return( page+1);
}
/* Add page to end of queue */
queue( page )
    int page;
{
    if (queue_head != 0)
    link[ queue_tail ] = page;
    else
    queue_head = page;
    link[ page ] = 0;
    queue_tail = page;
}
allocatepage( )
{
    /* Call Garbage Collector when heap is half full */
    if (allocatedpages = HEAPPAGES/2) {
        collect( );
        return;
    }
    /* Find next page not in current or next space */
    while (space[ freepage ] = current_space ||
        space[ freepage ] = next_space)
        freepage = next_page( freepage );
    /* conscnt = no. of cons cells in one page
    PAGE_to_CP(page) returns ptr to first cell
    in page */
    consent = PAGEBYTES/sizeof(CONS_CELL);
    consp = PAGE_to_CP( freepage );
    space[ freepage ] = next_space;
```

-continued

```
    allocatedpages = allocatedpages + 1;
    /* If Garbage Collecting, add freepage to queue */
    if (current__space != next__space) queue( freepage );
    freepage = next__page( freepage );
}
```

When a page needs to be allocated, the heap is searched starting at freepage (initially equal to firstheappage). Pages whose space field (initially zero) is not equal to current space and not equal to next space are considered to be free. When a page is allocated, its space field is set to next space and a counter called allocatedpages is incremented.

In addition, if garbage collection is in progress, the allocated page is added to the tail of a linked list of pages. Referring to FIG. 5, an array 72 called Link Queue stores a link field for each page. The beginning of the list is pointed to by a pointer called queue head, and the tail of the list is pointed to by a pointer called queue tail. In between, the link field of each page in the list points to (i.e., identifies) the next page in the list.

The garbage collector is invoked when half of the heap is full. It starts by advancing next space to the next space identifier. Next, it makes an educated guess as to what portions of the heap contain accessible items. This is done by examining each word in the stack and the registers (i.e., the root set) and looking for "hints". If the word could be a pointer into a page of the heap allocated to the current space, then that page is promoted to next space by changing the page's Space identifier (see FIG. 6).

At the completion of this phase, all pages containing items which might be referenced by pointers in the stack or registers have been promoted to next space - simply by changing the space field of these pages to next space. It is noted that this may result in the retention or a certain amount of storage which is not needed because portions of the promoted pages may contain inaccessible objects.

FIG. 6 shows a linked list of cons cells, the header of which is in a page pointed to by a "hint" in the root set, after the first phase of garbage collection.

The C language program for the first phase of this garbage collection method (for a system using only cons cells) is as follows:

```
/* Advance space */
next__space = (current__space + 1) & 077777;
allocatedpages = 0;
/* Promote current__space pages pointed to by hints in Root */
/*    CP__to__PAGE(page) returns page number of page
      containing the object pointed to by *cp */
queue head = 0;
for (fp = FRAMEPTR ; fp != STACKBASE ; fp = fp+1) {
  promote__page( CP__to__PAGE( *fp ) );
}
for (reg = FIRSTREG ; reg <= LASTREG ; reg = reg+1) {
  promote__page( CP__to__PAGE( processor__register( reg ) ) );
}
promote__page( page )
    int page;
{
    if (page >= firstheappage && page <= lastheappage &&
        space[ page ] = current__space) {
        space[ page ] = next__space;
        allocatedpages = allocatedpages + 1;
        queue( page );
    }
}
```

The next phase of the collection process is to copy all items referenced by the pages previously promoted into next space. This is done by analyzing all items stored in the pages in next space and moving into next space all objects in current space that are pointed to by the items already in next space. More particularly, each page in the queue is processed in the order that it is found in the queue, until all of the pages in the queue have been processed. Note that pages are added to the queue by the processing of moving objects into next space, thereby ensuring that all objects referenced by the root set are moved. The method of moving objects from current space to next space is similar to that used by the Stop and Copy collector. Once all pointers in pages in next space have been updated, current space is set to next space and garbage collection is complete.

The C language program for the second phase of this garbage collection method (for a system using only cons cells) is as follows:

```
while (queue__head != 0) {
    cp = PAGE__to__CP( queue__head );
    cnt = PAGEBYTES/sizeof(CONS__CELL);
    /* consp marks where the next moved cell will be move to */
    while (cnt != 0 && cp != consp) {
        cp->car = move( cp->car );
        cp->cdr = move( cp->cdr );
        cp = cp+1;
        cnt = cnt-1;
    }
    queue__head = link[ queue__head ];
}
CP move( cp )
    CP cp;
{
    /* If cp is NULL or points to an object already
        in the new space, no copying is needed */
    if  ((cp = NULL) ||
        (space[CP__to__PAGE( cp ) ] = next__space))
        return( cp );
    /* Return forwarding ptr for copied objects */
    if (space[ CP__to__PAGE( cp->car ) ] = next__space)
        return( cp->car );
    /* Copy object to new space, place forwarding ptr in old */
    cp->car = cons( cp->car, cp->cdr );
    return( cp->car );
}
/* Update current__space at the conclusion of collection */
current__space = next__space;
```

The move function for this embodiment of the invention differs from the move function in the Stop and Copy collector only in how it tests for a pointer pointing to an object being in the next space, i.e., new space. As before, objects are copied at most once and forwarding pointers are left in the old objects. FIG. 7 shows the list structure of FIG. 6 after the second and final phase of garbage collection.

Appendix 1 contains a pseudocode representation of the above described garbage collector, generalized for use with any set of program objects. This representation of the collector glosses over how the collector specifically handles varying length structures such as continuations, vectors of pointers, and strings of characters, because the mechanisms for handling a variety of different program objects will vary from system to system.

The pseudocode used in Appendix 1 and in Appendix 3 is, essentially, a computer language using universal computer language conventions. While the pseudocode employed here has been invented solely for the purposes of this description, it is designed to be easily understandable to any computer programmer skilled in the art.

Appendix 2 contains the complete listing for a C version of Collector I that implements a storage allocator similar to the C-library function "malloc". Once the heap is initialized by calling "gcinit", storage is allocated by calling "gcalloc". It is called with the size of the object in bytes, and a count which is the number of pointers to other heap allocated objects which are contained in the object. By convention, these pointers must occupy the initial words of the object. For further details about the calling sequence of these functions, the reader is directed to Appendix 2.

In order to customize the code in Appendix 2 for a particular system, the user must supply some processor specific information. The first is STACKINC which is used to specify the alignment of pointers on the stack. The collector assumes that a pointer may be stored at any location whose byte-address modulo STACKINC is zero. In the case of certain systems, such as the Titan system discussed below, STACKINC is 4 as the stack only contains 32-bit words. While a VAX processor can increment the stack pointer by one byte, compilers typically keep it aligned on a four-byte boundary, so a value of 4 is used for it too. Processors which do not keep pointers aligned on four-byte boundaries will have to examine the stack in smaller increments. Tests run with Titan Scheme indicate that only small amounts of additional storage are retained even with the assumption that a pointer could start at any byte address in the stack. Scheme is a dialect of Lisp. See Jonathan Rees, William Clinger (Editors), "Revised[3] Report on the Algorithmic Language Scheme," SIGPLAN Notices 21(12): 37–39, December, 1986.

The second item that must be provided to the collector in Appendix 2 is information about registers which may contain pointers to heap based objects when additional storage is being allocated. Since Titan programs can retain globals in registers and pass procedure arguments in registers, the registers must be inspected. This is enabled by defining register numbers FIRST REGISTER and LAST REGISTER, and a function for obtaining the value of a register, "register value". In the case of the VAX, no register information need be specified. This is because the VAX employs a "caller save" protocol to retain register values across procedure calls, so no valid pointers are ever in the registers during storage allocation.

Other aspects of the collector program shown in Appendix 2 are described below in the section entitled "Exemplary Implementation of the Invention".

Mostly-Copying Collector Version II

The "mostly-copying" collection method just described requires that all pages which might be promoted to the next generation be found at the start of collection. That is, all pages which are to be retained but not copied must be pointed to by hints in the root set.

In some systems, however, the root set does not include or identify all the ambiguous pointers in the set of accessible objects. That is, there may be ambiguous pointers inside program objects outside the root set, and thus there are pages which must be retained that rre not identifiable from the root set. Such ambiguous pointers must be treated as "hints", like the hints in the root set.

One example of such a system is a Scheme implementation where continuations (procedures which return the program to some previous state of the computation) are implemented by saving a copy of the program state. Such continuations need not be visible at the start of garbage collection, but they may contain "hints" (i.e., ambiguous pointers) to objects which cannot be copied. In order to be able to handle such objects, a second collection method is introduced.

The second collection method uses the cons cell data structure of the last two examples, with a small addition. Pointers are now allowed to reference objects outside the heap. Such a pointer is assumed to point to a cell which might contain a pointer which references an object in the heap. The cell might also contain an object which looks like a pointer, but isn't. Therefore it must be treated as a "hint", like the registers and the stack in the root set. Thus additional pages which must remain in place can be found at any time while the garbage collector is moving data.

The functions for storage allocation and many of the primitive operations used by Collector II are identical to those used in Collector I, so they will not be repeated here.

Figure 8:
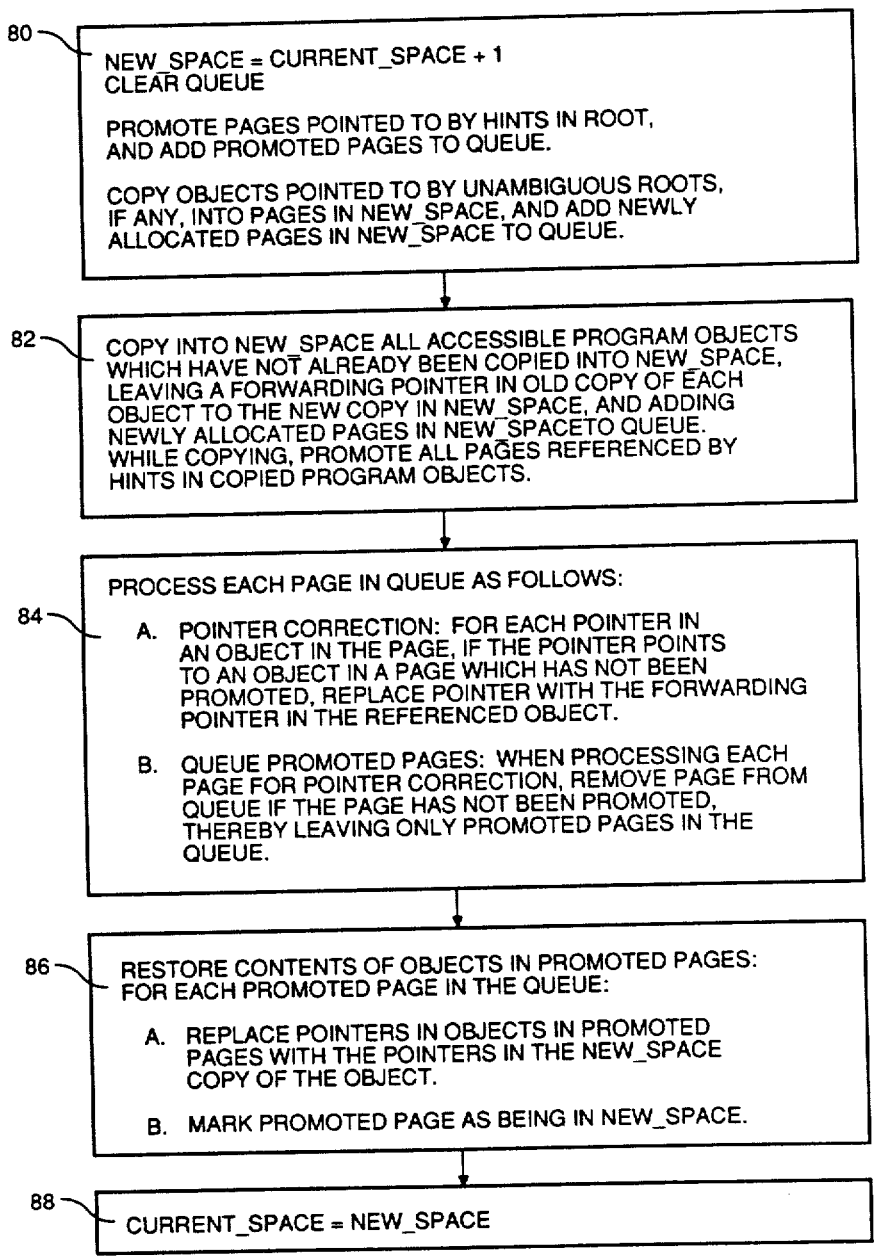
FIG. 8 shows a flow chart of a preferred embodiment of the garbage collection process of the present invention.

FIG. 8 shows a flow chart of the garbage collection process used by this embodiment of the invention. In addition, Appendix 3 contains a pseudocode representation of Collector II, generalized for use with any set of program objects.

Referring to FIG. 8, garbage collection starts by advancing the allocation space (next space) and searching the stack and the registers for initial roots (box 80). Using the register and stack contents for hints as in Collector I, pages containing the initial objects are marked for retention. However, pages are "promoted" to the next space in a different manner from the first algorithm. The space number of the promoted page is not changed. Instead a boolean flag, promoted, is set for the page. That is, the SpaceID array 70 in FIG. 5 is changed so as to include both a space number and a boolean flag called promoted for each page. The promoted flag is set whenever a page is promoted. As in Collector I, promoted pages are also queued.

The C language program for the first phase of this Collector II method (for a system using only cons cells) is as follows:

```
/* Advance space */
next_space = (current_space + 1) & 077777;
allocatedpages = 0;
/* Promote current_space pages pointed to by hints in Root */
queue_head = 0;
for (fp = FRAMEPTR ; fp != stackbase ; fp = fp + 1) {
  promote_page( CP_to_PAGE( *fp ) );
}
for (reg = FIRSTREG ; reg <= LASTREG ; reg = reg + 1) {
  promote_page( CP_to_PAGE(processor_register( reg ) ) );
}
promote_page( page );
  int  page;
{
  if (page >= firstheappage && page <= lastheappage &&
      space[ page ] = current_space &&
      promoted[ page ] = 0) {
    allocatedpages = allocatedpages + 1;
    promoted[ page ] = 1;
    queue( page );
  }
}
```

Once the initial hints in the root have been found and the corresponding pages promoted, the first phase of the collection process continues by copying the objects they directly reference and the objects referenced by the pointers in newly allocated objects until all accessible items have been copied to the "next space". See box 82 in FIG. 8. The C language program for this portion of Collector II is as follows:

```
/* Sweep promoted pages and move their constituent items */
i = queue_head;
while (i != 0) {
    cp = PAGE_to_CP( i );
    cnt = PAGEBYTES/sizeof(CONS_CELL);
    while (cnt != 0 && cp != consp) {
        if (promoted[ i ] = 1) {
            copy( cp );
        }
        else {
            copy( cp->car );
            copy( cp->cdr );
        }
        cp = cp+1;
        cnt = cnt-1;
    }
    i = link[ i ];
}
copy (cp )
    CP cp;
{
    int page;
    /* OK if pointer is NULL or points into next space */
    if (cp = NULL || space[ CP_to_PAGE( cp ) ] = next_space)
        return;
    /* If pointer points outside the heap, then found
        another "hint" or "root" which must be promoted */
    page = CP_to_PAGE( cp );
    if (page < firstheappage || page > lastheappage) {
        promote_page( CP_to_PAGE( cp->car ) );
        promote_page( CP_to_PAGE( cp->car) );
        return;
    }
    /* OK if cell is already forwarded */
    if (cp->car != NULL &&
        space[ CP_to_PAGE( cp->car ) ] = next_space)
        return;
    /* Forward cell, leave forwarding ptr in car of old cell */
    cp->car = cons( cp->car, cp->cdr );
}
```

The copy function for Collector II differs slightly from the move function of Collector I in that it does not return the pointer to the copied object, and because it must handle the additional case of newly discovered roots.

As in Collector I, all accessible items are copied into the next space by sweeping across the pages in the queue of promoted and copied pages. When pointers to cells outside the heap are found during this sweep, the contents of those cells are treated as hints which may identify more pages to retain and sweep.

When the sweep completes, all accessible objects will have copies in the next space, but the pointers in those objects will point to the old copy of the object, which in turn contains a forwarding pointer to the new copy. See FIG. 9 for a pictorial representation of effect of this process on the list data structure shown in FIG. 6.

In this version of Collector II, it is assumed that all of the pointers in the root set are "hints", i.e., ambiguous pointers. In many systems, however, the root set will contain both unambiguous and ambiguous pointers. In such a system, a garbage collector in accordance with the present invention could (or perhaps, should) promote only those pages pointed to by ambiguous pointers, while copying objects pointed to by the unambiguous pointers in the root set. In this way, pages pointed to only by unambiguous pointers in the root set would not be promoted, thereby reducing memory fragmentation caused by promoted pages. The remaining portions of the Collector II process would remain essentially the same as for the version of the collector being described herein.

The second phase of the Collector II process is called the correction phase (box 84 in FIG. 8). All pages which must be retained and promoted are now known, because they were referenced by pointers in the stack, registers, or saved state in continuations that were processed in the first phase of the collection process. Using this information, the pointers in the new copies of objects can now be corrected during a second sweep through the accessible objects in the heap: if the pointer points into the heap to an old page and the page is not being retained, then the correct pointer is the forwarding pointer found in the object. Otherwise, the correct pointer is the pointer to the old copy of the object in the retained page. During this phase, a list or queue of promoted pages is formed.

The C language program for the correction phase of Collector II is as follows:

```
i = queue_head;
promoted_head = 0;
while (i != 0) {
    if  (promoted[ i ] = 1) {
        x = link[ i ];
        link[ i ] = promoted_head;
        promoted_head = i;
        i = x;
    } else {
        cp = PAGE_to_CP( i );
        cnt = PAGEBYTES/sizeof(CONS_CELLS);
        while (cnt != && cp != consp) {
            cp->car = correct( cp->car );
            cp->cdr = correct( cp->cdr );
            cp = cp+1;
            cnt = cnt-1;
        }
        i = link[ i ];
    }
}
CP   correct( cp )
    CP cp;
{
    int page;
    page = CP_to_PAGE( cp );
    if (page >= firstheappage &&
        page <= lastheappage && promoted[ page ] = 0) {
        return( cp->car );
    }
    return( cp );
}
```

Figure 9:
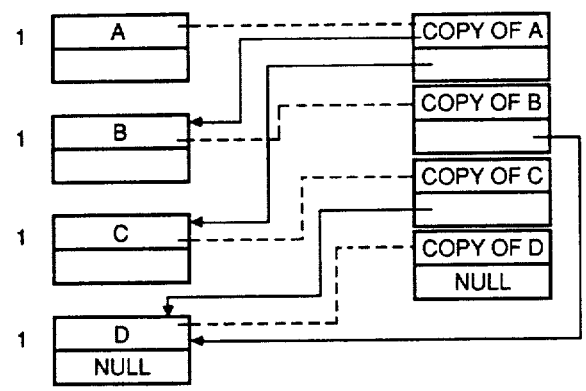
FIG. 9 depicts the list structure of FIG. 6 after processing by the first phase of the second preferred embodiment of the present invention.
Figure 10:
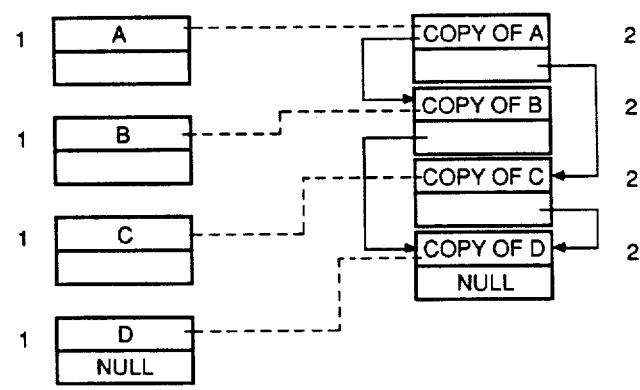
FIG. 10 depicts the list structure of FIG. 9 after processing by the pointer correcting phase of the second preferred embodiment of the present invention.
Figure 11:
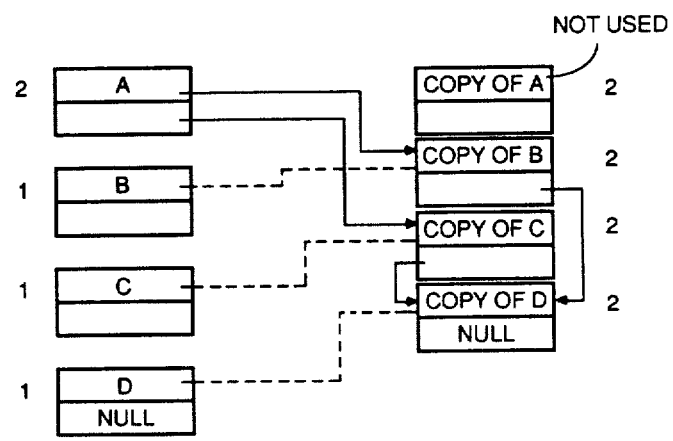
FIG. 11 depicts the list structure of FIG. 10 after processing by the restoration phase of the second preferred embodiment of the present invention.

See FIG. 10 for a pictorial representation of effect of the correction process on the list data structure shown in FIG. 9.

Following the correction phase, the third phase of the Collector II process is restoring the contents of the objects in the retained pages by copying back each object in a retained page using the forwarding pointer left in the object (box 86 in FIG. 8). The retained page's space identifier is updated a this time.

Setting the new value of current space completes the collection (box 88 in FIG. 8).

The C language program for the restoration phase of Collector II is as follows:

```
i = promoted_head;
while (i != 0) {
    promoted[ i ] = 0;
    cp = PAGE_to_CP( i );
    cnt = PAGEBYTES/sizeof(CONS_CELL);
    while (cnt != 0 && cp != consp) {
```

```
            -continued
        zp = cp >car;
        cp->car = zp->car;
        cp->cdr = zp->cdr;
        cp = cp+1;
        cnt = cnt-1;
    }
    space[ i ] = next_space;
    i = link[ i ];
}
current_space = next_space;
```

Figure 1:
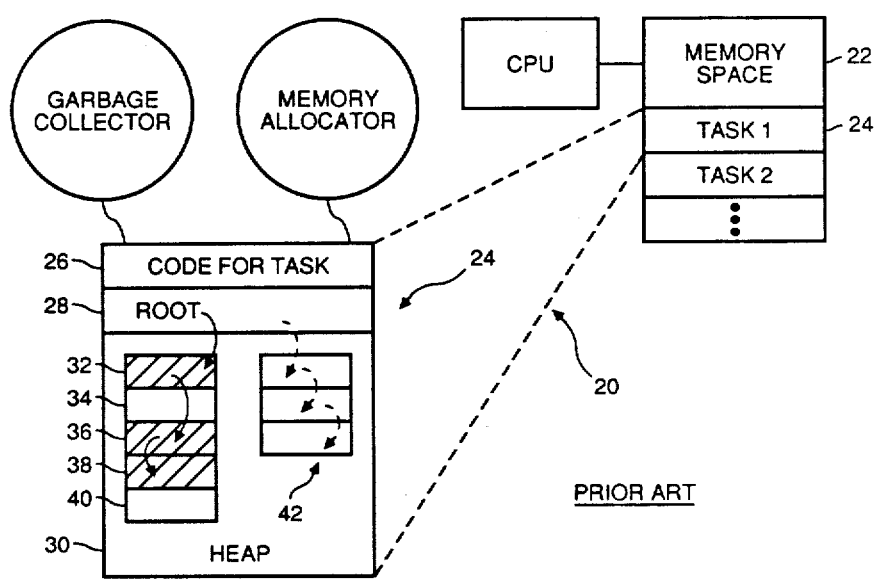
FIG. 1 depicts a dynamic storage and garbage collection system.

See FIG. 1 for a pictorial representation of effect of the restoration process on the list data structure shown in FIG. 10.

Exemplary Implementation of the Invention

The "mostly-copying" collection method of the present invention was developed to provide garbage collection for a Scheme implementation for the Titan, a high performance experimental workstation developed at the Western Research Laboratory of Digital Equipment Corporation. The "official" definition for the machine is not the processor's instruction set, but the Mahler intermediate language which is the object code produced by all compilers. When the Mahler code is compiled, extensive machine dependent optimization is done. Since details such as the number of registers and the mechanisms for local storage allocation and procedure call and return are hidden, conventional root finding methods are not applicable.

In order to be used in the Scheme system, the collection method described above needed several extensions. First, it needed to handle varying length structures such as continuations, vectors of pointers, and strings of characters. Next, with multiple kinds of objects in the heap, a mechanism for identifying the type of object was provided to allow a page to be swept. Finally, objects larger than a page were allowed.

These additions were made by associating some TYPE bits with each page. For Titan Scheme, these bits have the following values: PAIR, which indicates that the page contains cons cells, EXTENDED, indicating that the page contains objects whose type and length is encoded in a header word, and CONTINUED, which indicates that the page is part of the object defined on a previous page.

Storage allocation is more complex as there are now two "current free pages", one for cons cells and one for extended objects. Extended objects larger than a page are allocated as many pages as required, with some portion of the last page potentially unused. Extended objects smaller than a page are allocated on the current free extended page if they fit, or at the start of a new page if they do not. If an object does not fit on the remainder of the page, then the remainder is discarded.

Comparison with the Classical Stop and Copy Collector

The present invention is similar to the classical Stop and Copy collector in its resource demands. The additional flags required for each page can be stored in two 32-bit integers. Given a page size of 512 bytes, this requires less than 2% additional storage.

Like the classical Stop and Copy collector, the present invention is able to operate using a constant amount of stack as its processing is iterative. This is highly desirable as one wishes to be able to garbage collect a heap containing arbitrary structures.

Finally, the new collector's running time remains O(n), where n is the amount of retained storage. Collector I is very similar in running time to the classical Stop and Copy garbage collector, whereas collector II is probably twice as expensive due to the pointer correction scan. However, even it compares quite favorably with the running time of a mark-and-sweep collector which is O(m), where m is the total size of the heap.

Advantages of the Present Invention

The major advantage of the present invention over other garbage collectors is that it places far fewer restrictions on the initial root set. While the classical Stop and Copy collector and the present invention both require that a set of initial root set be designated, the classical collector requires that each member of the root set be a valid pointer. If this is not true, then programs using this collection method will not operate correctly. The present invention requires only that within the root set there must be ambiguous or unambiguous pointers to all accessible objects. However, it makes no requirements on the individual members of the root set. Any given cell or object in the root set may contain any value, including values that "look like" valid pointers. At worst, this will result in the retention of unneeded storage.

This less restrictive method for root finding also solves problems with register values computed from tagged pointers. As the present invention does not differentiate between pointers which point directly to an object and those which point into the middle of an object, cells which might contain a pointer (i.e., with ambiguous pointers) are simply made part of the root set. This assures that the objects that they reference will be retained and left at the same address.

Possible Disadvantages of the Present Invention

One possible concern about the garbage collection method provided by the present invention is that it might retain too much storage. By basing its decisions on hints and retaining all items on a page when a hint points to an object on a page, some amount of unneeded storage will be retained. A second concern is that too much storage may be locked in place, resulting in very little compaction. Before constructing a collector based upon the present invention, one would like some assurance that one is neither constructing a "too-much-copying" collector, nor a "rarely-copying" collector.

Storage Retention.

To get some understanding of possible storage retention problems, several different collectors for Titan Scheme were constructed. All collectors were based on Collector II, described above, as they had to concern themselves with references contained in continuations.

The first collector, MC-O, was also the first "mostly-copying" collector in accordance with the present invention (i.e., Collector II described above) constructed for Titan Scheme. At the time it was constructed, it was felt that significant steps should be taken to reduce retention of unnecessary storage. When the stack, register, and continuation cells are examined, the only objects that are considered to be a reference to an object are those which are a valid, tagged pointer to an object.

Pointers are verified by checking that they have a valid tag and that they point to a page in the current space with the same type tag. Cons cell pointers must also be double word aligned. Pointers to other objects must point to the object header. Headers are verified by checking that the appropriate bit is set in an allocation bit map which is associated with the heap. A side table is used here because any bit pattern, including a valid header, could occur within a string. When a cell passes this pointer test, the page containing the object that it references is locked in place. However, that object is the only object that is traced to find further accessible storage.

Note that in order for this scheme to work, it requires that any object which has an untagged pointer in the root set also have a real pointer with the correct tag in the root set.

One can argue that the Titan implementation of this collection method retains little or no unneeded storage. First, the stack will only contain Scheme pointers, stack pointers, and return addresses. A stack pointer or return address will never be confused with a Scheme pointer as they will always have the value of 0 in their low-order two bits, which is the tag for an immediate integer. Second, since the stack is always word aligned, only correctly aligned words need be examined as possible pointers. Thus, the registers are the only possible source of ambiguous pointers. As this implementation leaves very little to doubt, it is reasonable to believe its performance is similar to that of a classical Stop and Copy collector.

The second collector, MC-II, uses the methodology of Collector II described above. Here, any item in the stack, registers, or a continuation which can be interpreted as a pointer into a page in the current space will lock the page and trace all items on the page.

Each of these collectors was then used to run two sample programs with varying page sizes. The sample programs were the Titan Scheme compiler and repeated executions of the Boyer benchmark, described in Richard P. Gabriel, "Performance and Evaluation of Lisp Systems", The MIT Press, 1985, pages 116-135. The page size was varied from measured by observing the number of times that garbage collection took place and the amount of storage that was retained after each collection.

While it is dangerous to draw too many conclusions from such a small sample, it does suggest a few things about these variants of the mostly-copying collector described above. For small pages, (less than or equal to 256 bytes), both collectors have similar behavior. As page size increased, MC-II retained too much data. For Boyer with a page size of 4096 bytes, this over-retention resulted in 50% more collections than MC-O. Performance differences with the Scheme compiler was no where near as extreme, though MC-II continued to be less efficient than MC-O when using 4096 byte pages. As expected, MC-O's behavior was independent of page size.

As the page size gets smaller, one concern is that more storage will be wasted because more fractional pages will have to be discarded during storage allocation. In these sample runs, the worst case waste was less than 2% of the heap which was observed when running the Scheme compiler with 128 byte pages.

Page Locking.

Having shown that storage retention need not be a problem -ith mostly-copying collection, the problem of page locking will now be examined. The concern here is that too many pages will have to be locked which will result in too little compaction of storage.

The results of the previous section suggest that 512 bytes is a reasonable page size. For this page size, the worst case amount of heap being locked by any of the collectors was 2%. It is only by going to an extreme page size of 4096 bytes and using MC-II that too many pages were locked.

Summary

This present invention provides efficient compacting garbage collection without requiring well-defined roots. This collection method has been used within a Scheme system for the Titan, where the object code is an intermediate language.

While the invention was initially developed for use with Lisp systems, there is nothing in the present invention which restricts it to Lisp's notions of data structures, nor is there anything which requires bookkeeping by the compiler. It is therefore reasonable to consider how to use it with other languages such as Modula-2 or C. First, the root set must be identified. With compiler support, this could be done by declarations. Without it, the program could explicitly register such pointers with the collector or the collector could assume that the entire initial global area was to be included in the root set. Second, the pointer fields in heap allocated objects must be known and valid. Third, the data structures in the heap must be self-identifying. Finally, the program cannot depend upon the numerical value of a pointer as objects will be relocated. While none of these requirements place a large burden on a program, it is believed that they must be met in order for the present invention to operate.

Finally, the "mostly-copying" collector of the present invention compares favorably with the classical Stop and Copy collector in both processor and memory usage. Even though it has to "guess" which objects to keep, experience to date suggests that this does not lead to over-retention of storage.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, other systems and methods may be used to achieve the same end results of the disclosed collection method: retention of all heap pages pointed to by ambiguous pointers, and copying of all accessible program objects not in the retained pages.

APPENDIX 1

Pseudocode for Mostly-Copying Garbage Collector I

© Copyright 1987, 1988  Digital Equipment Corporation
All rights reserved.

/* Declarations */

| | | | |
|---|---|---|---|
| current_space | int | /* Space id of Old Space | */ |
| next_space | int | /* Space id of New Space | */ |
| heappages | constant | /* number of pages in heap | */ |
| space(heappages) | int_array | /* space id for each page | */ |
| allocatedpages | int | /* no. of pages in New Space | */ |

```
/* Begin Garbage Collection
   Phase 1: Process all pointers and hints in Root
           Promote pages pointed to by hints.
           Copy to New Space those objects pointed to by
           unambiguous pointers in Root.                    */ next_space = current_space+1   /* set space id for New Space */
allocatedpages = 0;
Clear Queue Loop: For each pointer/hint "ptr" in Root If ptr = NULL
          .Jump to End of Loop
       Endif page = page pointed to by ptr
       If ( ( ptr is ambiguous ) AND
            ( ptr points to a location inside the heap) AND
            ( space( page )=current_space) )
           space( page ) = next_space        /* promote page     */
           add page to Queue
           Jump to End of Loop
       Endif If ptr is unambiguous
           ptr = move (ptr)       /* move object and update ptr */
       Endif
End of Loop /*   Phase 2: Sweep all pages in New_Space and copy into New
     Space all accessible Program Objects which have not already
     been copied into New_Space, leaving a forwarding pointer
     in old copy of each object to the new copy in New_Space,
     and adding newly allocated pages in New_Space to Queue.   */ pg = first page in Queue
while (pg ≠ 0)
    cp  = pointer to first object in page pg
    while (cp points to an object in page pg)
        for each pointer "ptr" in cp
            cp.ptr = move ( cp.ptr )
        cp = cp + size object at cp
    End of While Loop
    pg = next page in Queue
End of While Loop /* Setting the new value of Current_space completes collection */
current_space = next_space /* **    Functions  Used by Garbage Collector:    ** */
```

```
Move Function:  move (ptr)
    /* ptr points to a program object to be moved.
       This function returns a pointer to the moved object.  */ object = object pointed to by ptr
    page = page containing object
    If ( ptr is NULL  OR  space(page) = next_space )
        Return (ptr)

Elseif (object contains a forwarding pointer, object.forward )
        Return (object.forward)
    Endif /* Copy object and store forwarding pointed in old object   */
    object.forward = copy(ptr)
    Return (object.forward)

Copy Function:  copy( ptr )
    /* Ptr points to Program Object to be copied */
    SZ = Size of Program Object referenced by ptr
    If Space Remaining in FreePage in New_Space < SZ
        Allocatedpages = Allocatedpages + 1
        FreePage  = New Page in New_Space
        FreeSpace = Top of FreePage
        Add FreePage to Queue
    Endif Copy Object to FreeSpace
    FreeSpace = FreeSpace + SZ
    Return (FreeSpace - SZ)
```

APPENDIX 2

Mostly-Copying Collector I for C Programs

© Copyright 1987  Digital Equipment Corporation
All rights reserved.

```
/* This module implements garbage collected storage for C programs using
   the "mostly-copying" garbage collection algorithm.

The module is initialized by calling:

gcinit( <heap size>, <stack base>, [ <global>, ... ,] NULL )

where <heap size> is the size of the heap in bytes, and <stack base> is
   the address of the first word of the stack which could contain a pointer
   to a heap allocated object.  Following this are zero or more addresses
   of global cells which will contain pointers to garbage collected
   objects.

This list is terminated by NULL.

Once initialized, storage is allocated by calling:

gcalloc( <bytes>, <pointers> )
``` where <bytes> is size of the object in bytes, and <pointers> is the
number of pointers into the heap which are contained in the object. The
pointers are expected to be at the start of the object. The function
will return a pointer to the data structure with its pointer cells
initialized to NULL.

For example, an instance of the structure:

```
struct symbol {
   struct *symbol  next;
   char name[10];
}
``` could be allocated by:

```
sp = (symbol*)gcalloc( sizeof( symbol ), 1 );
```

When the garbage collector is invoked, it will search the processor's
registers, the stack, and the global pointers for "hints" as to what
storage is still accessible. The hints from the registers and stack
will be used to decide which storage should be left in place. Note that
objects which are referenced by global pointers might be relocated, in
which case the pointer value will be modified.

N.B. This code assumes that pointers and integers are 32-bits long. It
also handles a variable number of arguments in a machine dependent
manner. Define the variable VAX for VAX code, or TITAN for Titan code.
*/

```
/* Exported items. */ typedef int  *GCP;          /* Type definition for a pointer to a garbage
                               collected object. */ extern   gcinit( /* <heap size in bytes>, <address of stack base>,
                    [<address of global ptr>, ...] NULL */ );

extern GCP gcalloc( /* <bytes> , <# of pointers> */ );

/* External definitions */ include <stdio.h>
extern   char *malloc( /* <# of bytes required> */ );

/* ****************************** */
/* Processor dependent definitions. */
/* ****************************** */

/* VAX */ ifdef VAX

/* Assume stack alignment on 32-bit words. */ define  STACKINC  4

/* No pointers will be in registers during garbage collection, so no
   register definitions need be supplied.
*/
```

```
#endif

/* Titan */ ifdef TITAN

/* Stack is 32-bit word aligned */ define  STACKINC  4

/* Assume that any register may contain a pointer.*/ define FIRST_REGISTER 0     /* First register to scan. */
define LAST_REGISTER  60    /* Last register to scan. */

/* The following function is called to read one of the Titan registers.  It
   must be open-coded using constant register numbers as zzReadRegister is
   actually a Mahler inline function which expects a constant register
   number.
*/ extern  zzReadRegister( /* <constant register #> */ );

unsigned   register_value( regnum )
{
    switch (regnum) {
        case  0: return( zzReadRegister(  0 ) );
        case  1: return( zzReadRegister(  1 ) );
        case  2: return( zzReadRegister(  2 ) );
                              .
                              .
                              .
        case 62: return( zzReadRegister( 62 ) );
        case 63: return( zzReadRegister( 63 ) );
        default: return( 0 );
    }
} endif

/* The heap consists of a contiguous set of pages of memory. */ int firstheappage,         /* Page # of first heap page */
    lastheappage,          /* Page # of last heap page */
    heappages,             /* # of pages in the heap */
    freewords,             /* # words left on the current page */
    *freep,                /* Ptr to the first free word on the
                              current page */
    allocatedpages,        /* # of pages currently allocated for storage
                              */
    freepage,              /* First possible free page */
    *space,                /* Space number for each page */
    *link,                 /* Page link for each page */
    *type,                 /* Type of object allocated on the page
                              */
    queue_head,            /* Head of list of pages */
    queue_tail,            /* Tail of list of pages */
    current_space,         /* Current space number */
    next_space,            /* Next space number */
    globals;               /* # of global ptr's at globalp */
```

```
unsigned *stackbase;          /* Current base of the stack */

GCP *globalp;                 /* Ptr to global area containing pointers */

/* Page type definitions */ define OBJECT 0
define CONTINUED 1

/* PAGEBYTES controls the number of bytes/page */ define PAGEBYTES 512
define PAGEWORDS (PAGEBYTES/sizeof(int))
#define WORDBYTES (sizeof(int))

/* Page number <--> pointer conversion is done by the following defines */ define PAGE_to_GCP( p ) ((GCP)((p)*PAGEBYTES))
define GCP_to_PAGE( p ) (((int)p)/PAGEBYTES)

/* Objects which are allocated in the heap have a one word header.  The form
of the header is:

31             17 16              1 0
    +----------------+-----------------+-+
    | # ptrs in obj  | # words in obj  |1|
    +----------------+-----------------+-+
    |         user data               |   <-- user data starts here. GCP
                    .                            ptrs come first
                    .
                    .
    |                                 |
    +---------------------------------+

The number of words in the object count INCLUDES one word for the header and
INCLUDES the words occupied by pointers.

When an object is forwarded, the header will be replaced by the pointer to
the new object which will have bit 0 equal to 0.
*/ define MAKE_HEADER( words, ptrs ) ((ptrs)<<17 | (words)<<1 | 1)
define FORWARDED( header ) (((header) & 1) == 0)
#define HEADER_PTRS( header ) ((header)>>17 & 0x7FFF)
#define HEADER_WORDS( header ) ((header)>>1 & 0xFFFF)
#define HEADER_BYTES( header ) (((header)>>1 & 0xFFFF)*WORDBYTES)

/* Garbage collector */

/* A page index is advanced by the following function */ int next_page( page )
    int  page;                /* Page number */
{
    if (page == lastheappage)  return( firstheappage );
    return( page+1 );
}

/* A page is added to the page queue by the following function. */
```

```
queue( page )
    int   page;                  /* Page number */
{
    if (queue_head != 0)
       link[ queue_tail ] = page;
    else
       queue_head = page;
    link[ page ] = 0;
    queue_tail = page;
}

/* A pointer is moved by the following function. */

GCP move( cp )
    GCP   cp;                    /* Pointer to an object */
{
    int   cnt,                   /* Word count for moving object */
          header;                /* Object header */
    GCP   np,                    /* Pointer to the new object */
          from, to;              /* Pointers for copying old object */

/* If NULL, or points to next space, then ok */
    if  (cp == NULL ||
         space[ GCP_to_PAGE( cp ) ] == next_space)
       return( cp );

/*  If cell is already forwarded, return forwarding pointer */
    header = cp[-1];
    if  (FORWARDED( header ))  return( (GCP)header );

/* Forward cell, leave forwarding pointer in old header */
    np = gcalloc( HEADER_BYTES( header )-4, 0 );
    to = np-1;
    from = cp-1;
    cnt = HEADER_WORDS( header );
    while  (cnt--) *to++ = *from++;
    cp[-1] = (int)np;
    return( np );
}

/*  Pages which have might have references in the stack or the registers are
    promoted to the next space by the following function.  A list of
    promoted pages is formed through the link cells for each page.
*/ promote_page( page )
    int  page;                   /* Page number */
{
    if (page >= firstheappage && page <= lastheappage &&
        space[ page ] == current_space)  {
      while  (type[ page ] == CONTINUED)  {
         allocatedpages = allocatedpages+1;
         space[ page ] = next_space;
         page = page-1;
      }
      space[ page ] = next_space;
      allocatedpages = allocatedpages+1;
      queue( page );
    }
}
```

```
collect()
{
    unsigned  *fp;           /* Pointer for checking the stack */
    int       reg,           /* Register number */
              cnt;           /* Counter */
    GCP       cp,            /* Pointer to sweep across a page */
              pp;            /* Pointer to move constituent objects */

/* Check for out of space during collection */
    if (next_space != current_space) {
       fprintf( stderr, "gcalloc - Out of space during collect\n" );
       exit( 1 );
    }
    /* Allocate current page on a direct call */
    if (freewords != 0) {
       *freep = MAKE_HEADER( freewords, 0 );
       freewords = 0;
    }
    /* Advance space */
    next_space = (current_space+1) & 077777;
    allocatedpages = 0;

/* Examine stack and registers for possible pointers */
    queue_head = 0;
    for (fp = (unsigned*)(&fp) ;
         fp <= stackbase ;
         fp = (unsigned*)(((char*)fp)+STACKINC) ) {
       promote_page( GCP_to_PAGE( *fp ) );
    } ifdef FIRST_REGISTER
    for (reg = FIRST_REGISTER ; reg <= LAST_REGISTER ; reg++) {
       promote_page( GCP_to_PAGE( register_value( reg ) ) );
    }
endif /* Move global objects */
    cnt = globals;
    while (cnt--)
       *globalp[ cnt ] = (int)move( *globalp[ cnt ] );

/*  Sweep across promoted pages and move their constituent items */
    while (queue_head != 0) {
       cp = PAGE_to_GCP( queue_head );
         while (GCP_to_PAGE( cp ) == queue_head && cp != freep) {
          cnt = HEADER_PTRS( *cp );
          pp = cp+1;
          while (cnt--) {
             *pp = (int)move( *pp );
             pp = pp+1;
          }
          cp = cp+HEADER_WORDS( *cp );
       }
       queue_head = link[ queue_head ];

}

/* Finished */
    current_space = next_space;
}
```

```
/* When gcalloc is unable to allocate storage, it calls this routine to
   allocate one or more pages.  If space is not available then the garbage
   collector will be called.
*/ allocatepage( pages )
    int   pages;                        /* # of pages to allocate */
{
    int   free,                         /* # contiguous free pages */
          firstpage,                    /* Page # of first free page */
          allpages;                     /* # of pages in the heap */ if (allocatedpages+pages >= heappages/2) {
      collect();
      return;
    }
    free = 0;
    allpages = heappages;
    while (allpages--) {
       if (space[ freepage ] != current_space &&
         space[ freepage ] != next_space) {
          if (free++ == 0)  firstpage = freepage;
          if (free == pages) {
             freep = PAGE_to_GCP( firstpage );
             if (current_space != next_space)
                queue( firstpage );
             freewords = pages*PAGEWORDS;
             allocatedpages = allocatedpages+pages;
             freepage = next_page( freepage );
             space[ firstpage ] = next_space;
             type[ firstpage ] = OBJECT;
             while (--pages) {
                space[ ++firstpage ] = next_space;
                type[ firstpage ] = CONTINUED;
             }
                return;
             }
          }
          else  free = 0;
       freepage = next_page( freepage );
       if (freepage == firstheappage)  free = 0;
    }
    fprintf( stderr,
            "gcalloc - Unable to allocate %d pages in a %d page heap\n",
            pages, heappages );
    exit( 1 );
}

/* The heap is allocated and the appropriate data structures are
   initialized by the following function.
*/ gcinit( heap_size, stack_base, global_ptr )
    int   heap_size;
    unsigned  *stack_base;
    GCP   global_ptr;
{
    char  *heap;
    int   i;
    GCP   *gp;
```

```
    heappages = heap_size/PAGEBYTES;
    heap = malloc( heap_size+PAGEBYTES-1 );
    if ((unsigned)heap & (PAGEBYTES-1))
        heap = heap+(PAGEBYTES-((unsigned)heap & (PAGEBYTES-1)));
    firstheappage = GCP_to_PAGE( heap );
    lastheappage = firstheappage+heappages-1;
    space = ((int*)malloc( heappages*sizeof(int) )) - firstheappage;
    for (i = firstheappage ; i <= lastheappage ; i++)  space[ i ] = 0;
    link = ((int*)malloc( heappages*sizeof(int) )) - firstheappage;
    type = ((int*)malloc( heappages*sizeof(int) )) - firstheappage;
    globals = 0;
    gp = &global_ptr;
    while (*gp++ != NULL)  globals = globals+1;
    if (globals) {
        globalp = (GCP*)malloc( globals*sizeof(GCP) );
        i = globals;
        gp = &global_ptr;
        while (i--) {
            globalp[i] = *gp;
            **gp = NULL;
            gp = gp+1;
        }
    }
    stackbase = stack_base;
    current_space = 1;
    next_space = 1;
    freepage = firstheappage;
    allocatedpages = 0;
    queue_head = 0;
}

/* Storage is allocated by the following function.  It will return a pointer
   to the object.  All pointer slots will be initialized to NULL.
*/

GCP gcalloc( bytes, pointers )
    int   bytes,              /* # of bytes in the object */
          pointers;           /* # of pointers in the object */
{
    int   words,              /* # of words to allocate */
          i;                  /* Loop index */
    GCP   object;             /* Pointer to the object */ words = (bytes+WORDBYTES-1)/WORDBYTES+1;
    while (words > freewords) {
        if (freewords != 0) *freep = MAKE_HEADER( freewords, 0 );
        freewords = 0;
        allocatepage( (words+PAGEWORDS-1)/PAGEWORDS );
    }
    *freep = MAKE_HEADER( words, pointers );
    for (i = 1; i <= pointers; i++)  freep[i] = NULL;
    object = freep+1;
    if (words < PAGEWORDS) {
        freewords = freewords-words;
        freep = freep+words;
    }
    else {
        freewords = 0;
    }
    return( object );
}
```

APPENDIX 3

Pseudocode for Mostly-Copying Garbage Collector II

© Copyright 1987, 1988  Digital Equipment Corporation
All rights reserved.

/* Declarations */

```
current_space         int           /* Space id of Old Space     */
next_space            int           /* Space id of New Space     */
heappages             constant      /* number of pages in heap   */ space(heappages)      int_array     /* space id for each page    */
promoted(heappages)   int_array     /* promoted flags            */
allocatedpages        int           /* no. of pages in New Space */
```

/* Begin Garbage Collection
    Phase 1A: Process all pointers and hints in Root
        Promote pages pointed to by hints.
        Copy to New Space those objects pointed to by
        unambiguous pointers in Root.               */

```
next_space = current_space+1    /* set space id for New Space */
allocatedpages = 0;
Clear Queue
Clear (promoted array)

Loop: For each pointer/hint "ptr" in Root

If ptr = NULL
        Jump to End of Loop
    Endif page = page pointed to by ptr
    If ( ( ptr is ambiguous ) AND ( promoted(page) = 0 )
        AND ( space(page)=current_space) )
            promoted (page) = 1                  /* promote page */
            add page to Queue
            Jump to End of Loop
    Endif If ( ptr is unambiguous )
        move( ptr)
    Endif
End of Loop
```

/*  Phase 1B: Sweep all pages in Queue and copy into New_Space
    all accessible Program Objects which have not already been
    copied into New_Space, leaving a forwarding pointer in old
    copy of each object to the new copy in New_Space, and adding
    newly allocated pages in New_Space to Queue.

While Copying, promote all pages referenced by hints in
    copied program objects.
*/

```
pg = first page in Queue
while (pg ≠ 0)
    cp   = pointer to first object in page pg
    while (cp points to an object in page pg)

/* Objects in promoted pages are copied to New Space */
        If promoted(pg) = 1
            move (cp)

Else
        /* Process pointers in objects already in New Space */

Loop: For each pointer "ptr" in object cp

/* Promote pages in Old Space referenced by Hints */
                If ( cp.ptr is ambiguous and points to an
                        unpromoted page in current_space )
                    promoted (page) = 1
                    add page to Queue
                Endif /* Move referenced objects not already in New Space */
                If ( cp.ptr is unambiguous )
                    move ( cp.ptr )
                Endif
            End of Loop cp = cp + size(object pointed to by cp)
    End of While Loop pg = next page in Queue
End of While Loop /* Phase 2: Process each Page in Queue as follows:
   a.   Pointer Correction: For objects in pages other than
        promoted pages, replace pointers to objects in unpromoted
        page with the forwarding pointer in the referenced object.

b.   Remove unpromoted pages from the Queue, thereby leaving
        only Promoted Pages in the Queue.                        */ pg = first page in Queue
While (pg ≠ 0)
    If promoted( pg ) = 0
        cp   = pointer to first object in page pg While (cp points to an object in page pg)
            For each pointer "ptr" in object cp
                cp.ptr = correct( cp.ptr )

cp = cp + size(object pointed to by cp)
        End of While Loop remove page pg from the Queue
    Endif
    pg = next page in Queue
End of While Loop
```

```
/* Correct unambiguous pointers in Root */
Loop: For each pointer/hint "ptr" in Root
    If ( ptr is unambiguous )
        ptr = correct( ptr)
    Endif
End of Loop /* Phase 3:  Restore contents of Objects in Promoted Pages.
   For each Promoted Page in the Queue:

a.  Replace pointers in Objects in Promoted pages
           with the pointers in the New Space copy of Object.

b.  Mark Promoted Pages as being in New Space.          */ pg = first page in Queue        /* Start with first promoted page */
While (pg ≠ 0)
    promoted( pg ) = 0
    space( pg ) = next_space
    cp  = pointer to first object in page pg /* Process each object in Page pg */
    While (cp points to an object in page pg)
        newcp   = cp.forward    /* forwarding pointer in object */

/* Replace each ptr in object with ptr in its copy */
        For each pointer "ptr" in object cp
            cp.ptr = newcp.ptr cp = cp + size of object cp
    End of While Loop pg = next page in Queue
End of While Loop /* Setting the new value of Current_space completes collection */ current_space = next_space

/* **  Functions Used by Garbage Collector  **  */

Move Function:  move (ptr)
    /* ptr points to a program object to be moved.
       This function returns a pointer to the moved object.  */ object = object pointed to by ptr
    page = page containing object
    If ( ptr is NULL  OR  space(page) = next_space )
        Return (ptr)

Elseif (object contains a forwarding pointer, object.forward )
        Return (object.forward)
    Endif
```

```
/* Copy object and store forwarding pointed in old object   */
object.forward = copy(ptr)
Return (object.forward)

Copy Function:  copy( ptr )
    /*  Ptr points to Program Object to be copied */
    SZ = Size of Program Object referenced by ptr
    If Space Remaining in FreePage in New_Space < SZ
        Allocatedpages = Allocatedpages + 1
        FreePage = New Page in New_Space
        FreeSpace = Top of FreePage
        If New_Space ≠ Current_Space
            Add FreePage to Queue
        Endif
    Endif Copy Object to FreeSpace
    FreeSpace = FreeSpace + SZ
    Return (FreeSpace - SZ)

Correct Function:  correct( ptr )
    /* "ptr" points to a program object.   Function returns
       "corrected pointer.                                    */
    If (ptr points to object which is not in a promoted page)
        Return (ptr.forward)
    Else
        Return (ptr)
    Endif
```

What is claimed is:

1. A garbage collection method for recovering unused memory in a heap of dynamically allocated storage, the steps of the method comprising:
dividing a heap of storage into a multiplicity of pages;
labelling as allocated pages each page in said heap allocated for storing program objects, and labelling as unallocated pages all other pages of the heap;
identifying a root set of hints which point directly and indirectly to all of the accessible program objects stored in said heap, said program objects storing additional hints pointing to other ones of said program objects; said hints including unambiguous pointers to program objects stored in said heap and ambiguous pointers which may or may not point to program objects stored in said heap;
labelling as promoted pages, pages labelled as allocated and pointed to by ambiguous pointers in said root set and in said accessible program objects; and
copying all said accessible program objects, excepting those in promoted pages, to newly allocated pages in said heap;
said steps of labelling promoted pages and copying including the steps of labelling said promoted pages and newly allocated pages as allocated pages, and labelling all other pages in said heap as unallocated pages.

2. The garbage collection method as set forth in claim 1, said copying step including the step of replacing unambiguous pointers to the program objects copied by said copying step with pointers to the copies of said program objects created by said copying step.

3. A garbage collection system for recovering unused memory in a heap of dynamically allocated storage, comprising:
heap organizing means for dividing a heap of storage into a multiplicity of pages, and for labelling as allocated pages each page in said heap allocated for storing program objects, and labelling as unallocated pages all other pages of the heap;
root means for identifying a root set of hints which point directly and indirectly to all of the accessible program objects stored in said heap, said program objects storing additional hints pointing to other ones of said program objects; said hints including unambiguous pointers to program objects stored in said heap and ambiguous pointers which may or may not point to program objects stored in said heap;
relabelling means for labelling as promoted pages, pages labelled as allocated and pointed to by ambiguous pointers in said root set and in said accessible program objects; and copying means for copying all said accessible program objects, excepting those in promoted pages, to newly allocated pages in said heap;

said relabelling and copying means including means for labelling said promoted pages and newly allocated pages as allocated pages, and for labelling all other pages in said heap as unallocated pages.

4. The garbage collection system set forth in claim 3, said copying means including means for replacing unambiguous pointers to the program objects copied by said copying means with pointers to the copies of said program objects created by said copying means.

5. A dynamic memory allocation and recovery method, comprising the steps of:

providing a heap of storage space for storing program objects, said heap being divided into a multiplicity of pages, and labelling means for denoting each said page as unallocated, allocated and newly allocated for storing program objects;

providing a root set of hints directly and indirectly pointing to all accessible program objects stored in said heap, said hints including unambiguous pointers to program objects stored in said heap and ambiguous pointers which may or may not point to program objects stored in said heap; said program objects containing additional pointers to other ones of said program objects;

labelling as retained pages the allocated pages in said heap pointed to by said ambiguous pointers;

copying into newly allocated pages of said heap said accessible program objects, excluding program objects stored in said retained pages;

replacing pointers to the program objects copied by said copying step with pointers to the copies of said program objects created by said copying step; and identifying as allocated pages said retained pages and said newly allocated pages containing program objects which were copied by said copying step, and identifying all other pages as unallocated.

6. A dynamic memory allocation and recovery method as set forth in claim 5, said garbage collection step including the step of identifying ambiguous pointers in said program objects and retaining the allocated pages in said heap pointed to by said ambiguous pointers.

7. A computer memory managment system, comprising:

means for providing a heap of storage space for storing program objects generated by a task, said heap being divided into a multiplicity of pages;

means for denoting said pages in said heap as unallocated, allocated and newly allocated to said task;

dynamic storage means for dynamically allocating pages of said heap to said task and for storing program objects in said allocated pages;

a root storage area for storing unambiguous pointers and ambiguous pointers to said program objects stored in said heap;

said dynamic storage means including means for storing pointers to said stored program objects in said root storage are and in other ones of said program objects stored in said heap; said pointers in said root set thereby providing access to the set of accessible program objects in said heap; and garbage collection means for reducing the number of pages in said heap occupied by said set of accessible program objects in said heap, said garbage collection means including:

means for denoting as retained pages the allocated pages in said heap pointed to by said ambiguous pointers;

means for copying into newly allocated pages of said heap program objects pointed to by said unambiguous pointers in said root storage area and in said set of accessible program objects in said heap;

means for replacing unambiguous pointers to the program objects copied by said copying means with pointers to the copies of said program objects created by said copying means, excepting pointers, if any, to program objects located in said retained pages; and means for denoting as allocated pages said retained pages and said newly allocated pages containing the copies of program objects made by said copying means, and for denoting all other pages in said heap as unallocated.

8. A computer memory managment system as set forth in claim 7, including means for storing ambiguous pointers in selected ones of said accessible program objects; said means for denoting retained pages including means for denoting as retained the allocated pages in said heap, if any, pointed by said ambiguous pointers stored in said accessible program objects.

9. A computer memory managment system as set forth in claim 8, said copying means including means for leaving a forwarding pointer in each said copied program object to the copy of said program object made by said copying means;

said replacing means including means for replacing each pointer in said copies of said program objects with said forwarding pointer in the program object pointed to by said pointer.

10. A computer memory managment system as set forth in claim 8, including means for replacing each pointer in those of said program objects in said retained pages which have been copied by said copying means with the corresonding pointer in the copy of said program object.

* * * * *